(12) United States Patent
Williams

(10) Patent No.: US 7,337,173 B1
(45) Date of Patent: Feb. 26, 2008

(54) COMPILER HAVING GLOBAL ELEMENT OPTIMIZATION

(75) Inventor: David J. Williams, San Francisco, CA (US)

(73) Assignee: Netscape Communications Corporation, Mountain View, CA (US)

( * ) Notice: Subject to any disclaimer, the term of this patent is extended or adjusted under 35 U.S.C. 154(b) by 0 days.

(21) Appl. No.: 08/984,904

(22) Filed: Dec. 4, 1997

(51) Int. Cl.
*G06F 9/45* (2006.01)

(52) U.S. Cl. .................... 707/100; 395/705; 395/708
(58) Field of Classification Search ............... 395/707, 395/708, 709, 710, 705
See application file for complete search history.

(56) References Cited

U.S. PATENT DOCUMENTS

| | | | | |
|---|---|---|---|---|
| 5,230,050 A | * | 7/1993 | Iitsuka et al. | 395/707 |
| 5,367,683 A | * | 11/1994 | Brett | 395/709 |
| 5,555,417 A | * | 9/1996 | Odnert et al. | 395/707 |
| 5,768,595 A | * | 6/1998 | Gillies | 395/709 |
| 5,822,787 A | * | 10/1998 | Zucker | 711/213 |
| 5,850,549 A | * | 12/1998 | Blainey et al. | 395/705 |

OTHER PUBLICATIONS

Bacon, D.; Graham, S.; Sharp, O.; "Compiler Transformations for High-Performance Computing"; ACM Computing Surveys; vol. 26, No. 4, pp. 345-420, Dec. 1994.*

Aho, A.; Sethi, R.; Ullman, J.; "Compilers: Principles, Techniques, and Tools"; Addison-Wesley Publishing Company; pp. 389-455 and 585-722, Mar. 1988.*

* cited by examiner

*Primary Examiner*—Tariq R. Hafiz
*Assistant Examiner*—Brian Sattizahn
(74) *Attorney, Agent, or Firm*—Michael A. Glenn; Glenn Patent Group

(57) ABSTRACT

An optimization technique is provided which automatically reduces the number of globals in a program to the minimum required. The optimization technique identifies those elements which are placed in a program as global elements, but which do not need to be global elements. The optimization technique parses all files in a program, identifies all global elements, and removes any global elements that are not used outside of a particular file within the program by converting these global elements to local elements or by disregarding those elements.

29 Claims, 4 Drawing Sheets

COMPILER HAVING GLOBAL ELEMENT OPTIMIZATION

BACKGROUND OF THE INVENTION

1. Technical Field

The invention relates to compilers. More particularly, the invention relates to a unique procedure for global element optimization within a compiler.

2. Description of the Prior Art

FIG. 1 is a block schematic diagram of a uniprocessor computer architecture 10, including a processor cache. In FIG. 1, a processor 11 includes a cache 12 which is in communication with a system bus 15. A system memory 13 and one or more I/O devices 14 are also in communication with the system bus.

FIG. 2 is a block schematic diagram of a software compiler 20, for example as may be used in connection with the computer architecture 10 shown in FIG. 1. The compiler Front End component 21 reads a source code file (100) and translates it into a high level intermediate representation (110). A high level optimizer 22 optimizes the high level intermediate representation 110 into a more efficient form. A code generator 23 translates the optimized high level intermediate representation to a low level intermediate representation (120).

The low level optimizer 24 converts the low level intermediate representation (120) into a more efficient (machine-executable) form. Finally, an object file generator 25 writes out the optimized low-level intermediate representation into an object file (141). The object file (141) is processed along with other object files (140) by a linker 26 to produce an executable file (150), which can be run on the computer 10.

The compiler is the piece of software that translates the source code of a programmer written in a programming language, such as C, BASIC, or FORTRAN, into a binary image (i.e. the object code) that actually runs on a machine. Program written in the C/C++ language have two types of program elements, i.e. global elements and static (or file local) elements. Some systems, such as those manufactured by Computer Graphics, Inc. of Mountain View, Calif., impose a hard limit on the number of global elements that a given program may have. Usually there is no limit on the number of static elements within a program.

In traditional C code, the limit on global elements is usually avoided by declaring program elements as static whenever possible. Because of the nature of C++, this tactic is not effective. Making program elements static is difficult without compromising the model of development that C++ requires of the programmer. As a result, C++ programs tend to have a much higher global element count than for the same program implemented in C. It should be noted that this problem is not specific to C++. Rather, CC++ tends to highlight the problem, and offers no direct way to address it.

The problem of a high global element count has been addressed in the past by breaking the program into two or more pieces. Each program component (library) has the same limit of global elements that the original program had, such that the number of global elements available is increased significantly by breaking the program into two or more pieces. However, instead of delivering the program as one file, the prior approach to solving the global element limitation problem requires that the program be delivered as two or more files. This makes such tasks as installation and administration much more difficult. For example, in Unix systems this approach changes the model of use significantly.

It would be advantageous to provide an optimization technique that allows a programmer to produce a program without requiring that the program be broken into two or more pieces because a limit on global elements has been exceeded as a result of the program size.

SUMMARY OF THE INVENTION

The invention provides an optimization technique that automatically reduces the number of globals in the program to the absolute minimum without regard to programming language, program organization, or size. In particular, the invention addresses the problem that arises in programming languages, such as C++, where the number of global elements is a hard limit. For example, on (Silicon Graphics, Inc.) systems, that use a global offset table the number of entries that may be placed in a global offset table (and therefore the number of global elements in a program) is limited by the width of the instruction word.

The invention provides an optimization technique that identifies those elements which are placed in a program as global elements when the program is written, but which do not need to be global elements when the program is run, i.e. they are not inter-program elements and/or they are redundant or unused during program execution. The optimization technique parses all files in a program, identifies all global elements, and removes any global elements that are not used outside of a particular file within the program by converting these global elements to local elements. The optimization process removes redundant global elements from the program files, and instructs the compilation process to treat those global elements that are not used as though they were local elements because they do not access the global offset table. As a result, a more compact and faster running executable is produced.

DETAILED DESCRIPTION OF THE INVENTION

The invention provides an optimization technique that allows a programmer to produce a program, such as a C++ program, without requiring that the program be broken into two or more pieces because a limit on global elements has been exceeded as a result of the program size.

The invention provides an optimization technique that identifies those elements which are placed in a program as global elements, but which do not need to be global elements, i e. they are not inter-program elements and/or are redundant or unused. The optimization technique parses all files in a program, identifies all global elements, and removes any global elements that are not used outside of a particular file within the program by converting these global elements to local elements. The optimization process removes redundant global elements from the program files, and instructs the compilation process to treat those global elements that are not used as though they were local elements because they are only accessed local in the file, and therefore do no need to be global elements.

Figure 1:
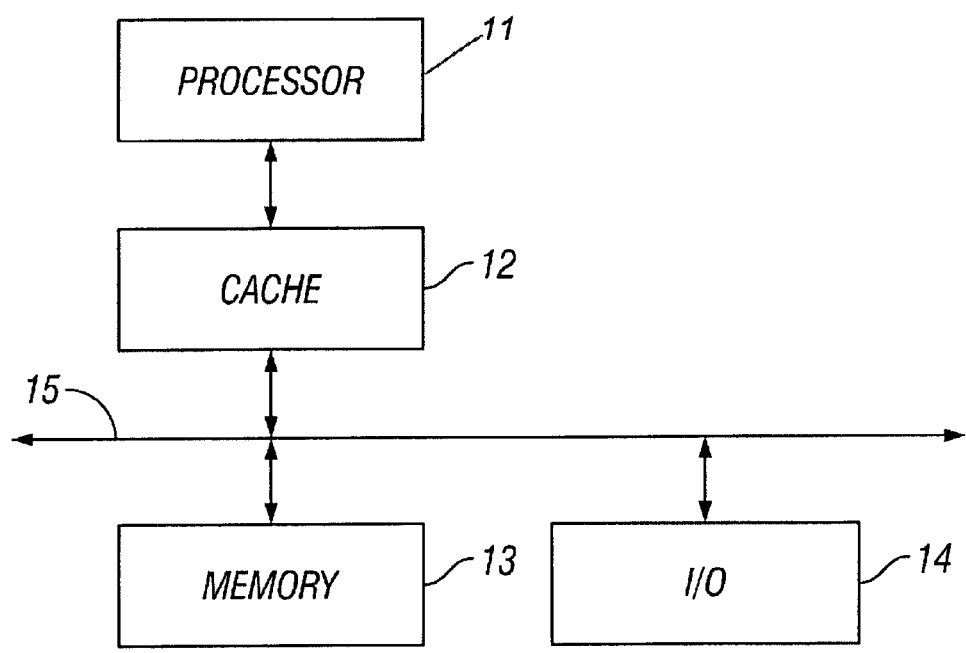
FIG. 1 is a block schematic diagram of a uniprocessor computer architecture.
Figure 2:
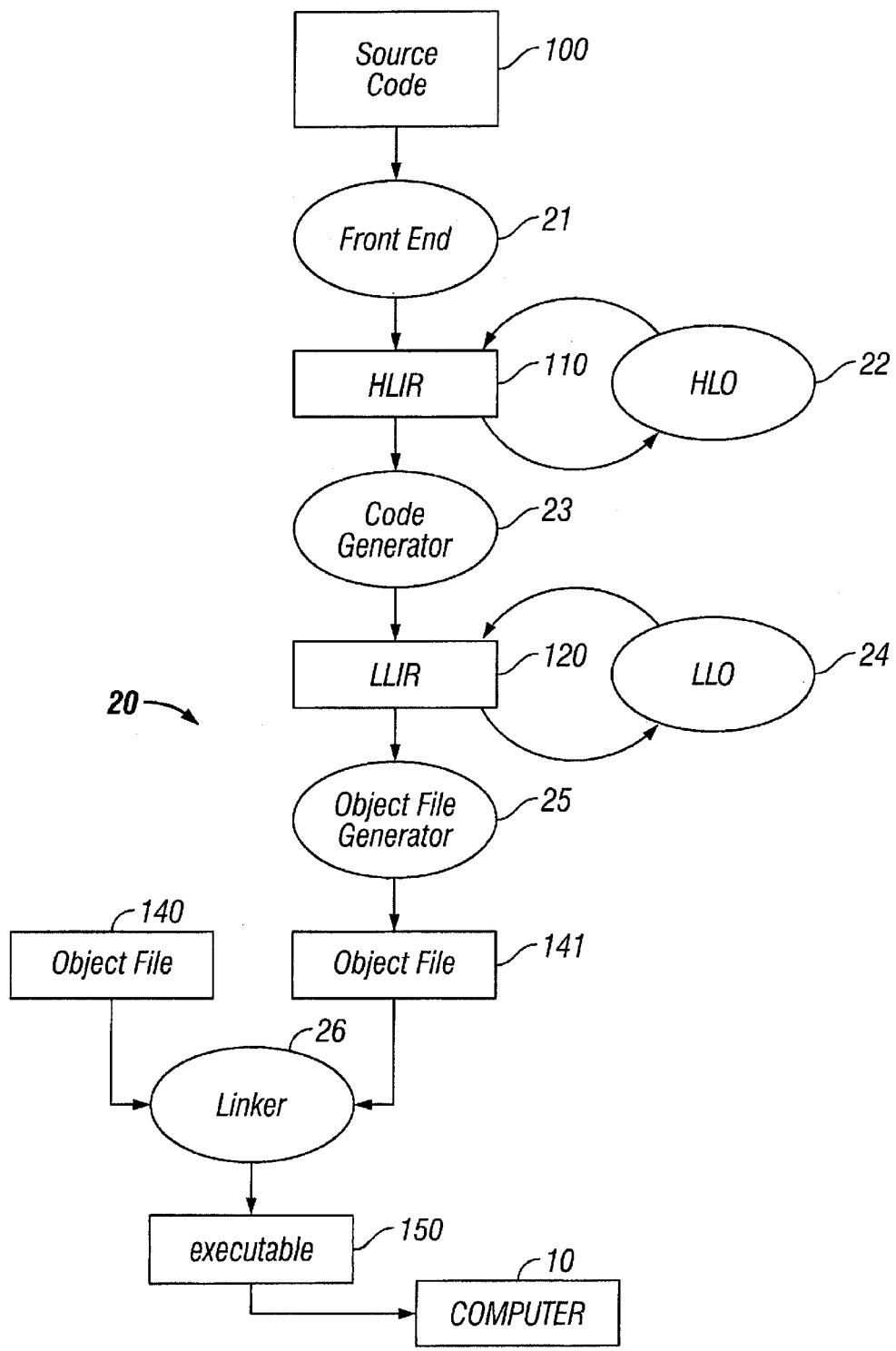
FIG. 2 is a block schematic diagram of a software compiler.
Figure 3:
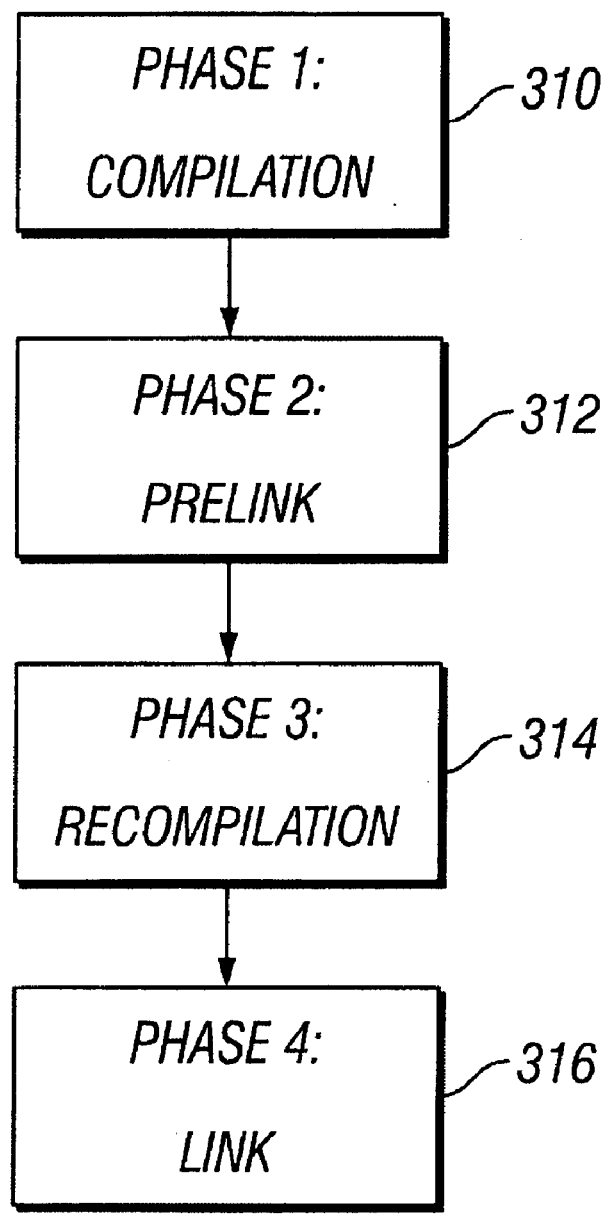
FIG. 3 is a block diagram showing a four phase compilation technique according to the invention.

FIG. 3 is a block diagram showing a four phase compilation technique according to the invention. The herein described optimization technique is intended for use in connection with any standard compilation process, such as the Cor C++ compilation process (for example as shown in FIG. 1 and as described above). The process begins with a source program that includes two or more files. During compilation (Phase 1) 310, the optimization technique builds a database that contains information regarding each of the global elements that are within each file of a program being compiled. As a result, the compilation process is provided with knowledge of all system elements, i.e. whether they are global or local. The compilation process then provides a prelink step (Phase 2) 312 in which the compiled files (object files) are analyzed. During this step, the optimization process determines which global elements do not need to be global elements and/or which global elements are redundant or unused. The program files are then recompiled (Phase 3) 314, during which step the global elements that do not need to be global elements are converted to local elements, and global elements that are redundant or unused are disregarded. Finally, the program files are linked and a compiled object file is produced (Phase 4) 316.

Figure 4:
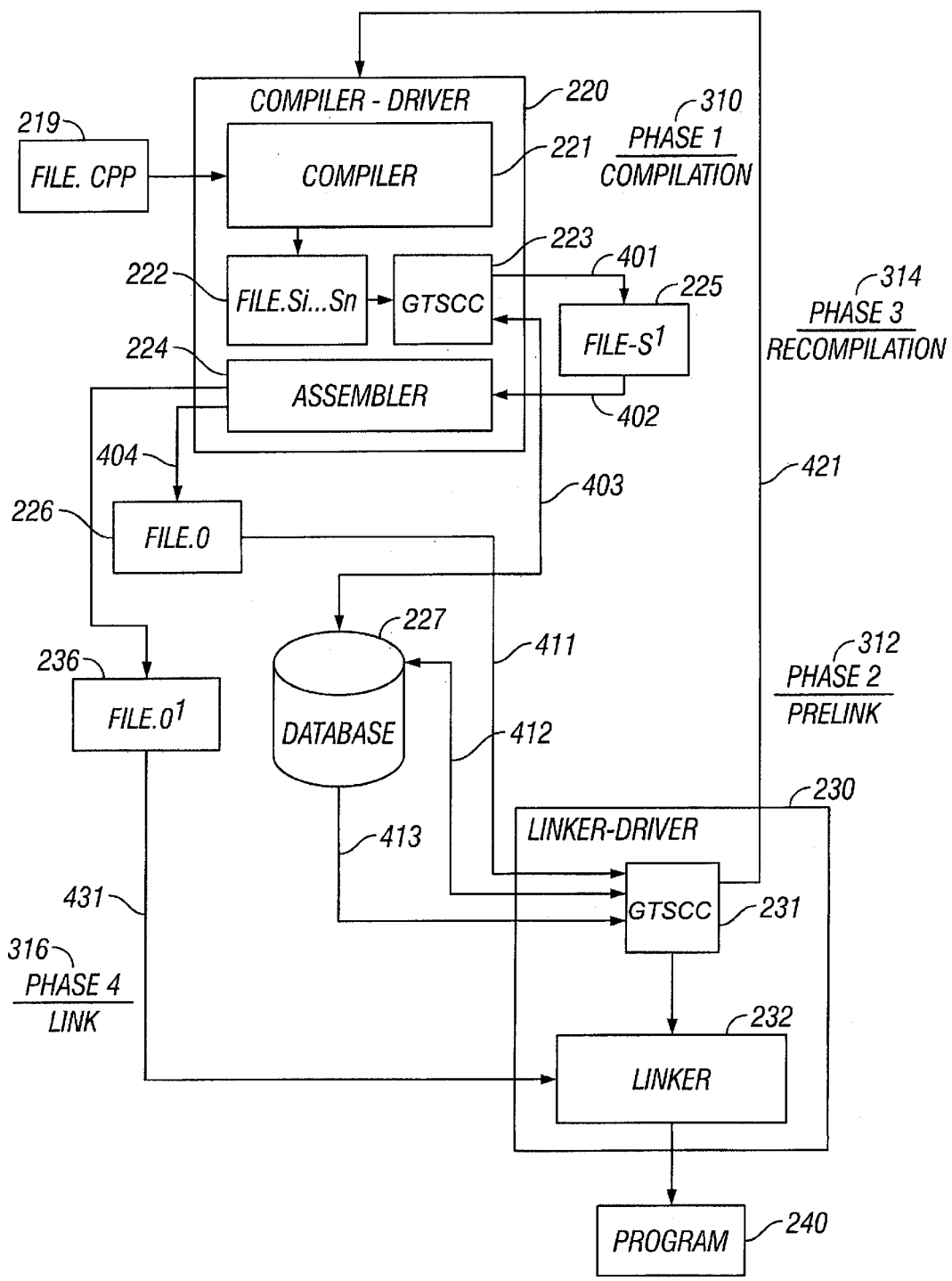
FIG. 4 is a block schematic diagram of a compiler showing the four phase compilation process of FIG. 3 according to the invention.

FIG. 4 is a block schematic diagram of a compiler showing the four phase compilation process of FIG. 3 according to the invention. During Phase 1 (310), a source program, e.g. File.CPP 219, is provided to a compiler driver 220, which includes a compiler 221. The compiler (221) compiles a file File.CPP and produces an assembler source File.S 222. The file is analyzed by a global to local symbol conversion module (GTSCC) 223 to identify all global elements in the file. A database 227, which is a text file in the preferred embodiment of the invention, is provided to record the method and results of the first compilation step during Phase 1 for use later. This action is identified on FIG. 4 by the line having the numeric designation 403. The assembler source file File.S' 225 thus produced (which action is identified on FIG. 4 by the line having the numeric designation 401) which is presented to an assembler 224. This action is identified on FIG. 4 by the line having the numeric designation 402. The assembler produces (which action is identified on FIG. 4 by the line having the numeric designation 404) an object file File.O 226. This process is repeated for each file in the source program until the entire program has been initially compiled. At the end of Phase 1, the system has information regarding the manner in which the files are to be compiled (which results from standard compile action) and a current list of global elements (which is produced in accordance with the invention).

During Phase 2 (312), each object file in the program (i.e. those files produced from the source code during the first compilation step of Phase 1, as discussed above) is analyzed in the linker driver 230 by a GTSCC 231. This action is identified on FIG. 4 by the line having the numeric designation 411. This step is a prelink step that determines all dependencies within the object files, i.e. those global elements that are used in more than one file. A determination is made for each global element at this time if a given function must be global. The tGTSCC determines if an element is currently global, if the element is not used outside of the file in which it currently resides, and if the element is actually being used by the file. The database is then updated to record the desired slate of elements which were originally global. This allows the recompilation process (314) to be restarted if required after some kind of serious failure. This action is identified on FIG. 4 by the lines having the numeric designations 412 and 413.

At the end of Phase 2, the system has information regarding the requirements of the program for global elements, i.e. which global elements are actually required by the program, both within the local file and outside of the local file. In this way, the invention determines which global elements may be safely converted to local elements (e.g. because they are not used outside of the local file) and which global elements may be disregarded (e.g. because they are not used or are redundant), thereby minimizing the number of global elements. The invention contemplates additional optimization as a result of the technique described herein which will be apparent to those skilled in the art. For example, global "inline" functions created for debugging purposes by the compiler may be converted to local elements using the technique described herein.

During Phase 3 (314), a second, final compilation occurs. The results of Phase 2 (i.e. information stored as a result of operation upon the source during Phase 1 and Phase 2 to produce the compiled and prelinked files) are available to the GTSCC 223 via the database 227. This action is shown by the line on FIG. 4 having the numeric designation 421. The source file File.CPP 219 is recompiled by the compiler 221 which produces the file File.S. The GTSCC 223 produces a file File.S", during which process selected global elements are converted to local elements, and redundant and/or unused are disregarded. The file File.S" is provided to the assembler 224, which then produces a compiled file File.O' 236. This file is then provided to the linker driver 230, as shown by the line having the numeric designation 431.

During Phase 4 (316), the linker 232 is employed to link the compiled object files which comprise the program. As a result, a compiled program 240 is produced in which unused, unnecessary, and redundant global elements have been converted to local elements or disregarded entirely. The object code thus produced runs faster because of the reduced use of globals and/or to execute unneeded or redundant instructions. Additionally, a larger program may be produced because there is no need to separate the program into two or more pieces as a result of the global offset table capacity being exceeded.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

I claim:

1. In a compiler, an optimization method comprising the steps of:

executing a first compilation step, said first compilation step comprising the steps of:

compiling a source program during said first compilation step; and building a database during said first compilation step that identifies each global element within said source program and that identifies how to recompile said source program;

performing a prelink step during which said source program compiled during said first compilation step is analyzed to determine which global elements do not need to be global elements;

executing a second compilation step, said second compilation step comprising the step of:

recompiling said source program during a second compilation step, during which step said global elements that do not need to be global elements are converted to local elements; and linking said recompiled source program to produce a compiled object file.

2. The method of claim 1, further comprising the step of:
providing said source program to said compiler for use during said first compilation step.

3. The method of claim 2, further comprising the step of:
providing a global to local symbol conversion module for identifying all global elements in said source program and for producing an assembler source file during said first compilation step.

4. The method of claim 3, further comprising the step of:
providing an assembler for receiving said assembler source file and for producing an object file therefrom.

5. The method of claim 4, further comprising the step of:
providing a global to local symbol conversion module during said prelink step for determining all dependencies within said object file.

6. The method of claim 5, wherein said determination of said dependencies comprises identifying global elements that are used in more than one file.

7. The method of claim 5, wherein said global to local symbol conversion module determines if an element is currently global, if the element is not used outside of the file in which it currently resides, and if the element is actually being used by the file.

8. The method of claim 5, wherein said determination is made for each global element to determine if a given function must be global.

9. The method of claim 5, wherein said database is accessed to include information regarding global element dependencies.

10. The method of claim 9, wherein database access is a process that to involves both reading data produced to identify global elements and writing data produced to identify desired state for these global elements.

11. The method of claim 1, wherein an object file produced from said source program during the first compilation step is analyzed by a linker during said prelink step.

12. The method of claim 1, wherein information regarding the manner in which said source program is to be compiled and a current list of global elements is available after said first compilation step is completed.

13. The method of claim 1, further comprising the step of:
determining which global elements may be safely converted to local elements because they are not used outside of the local file and which global elements may be disregarded because they are not used or are redundant.

14. The method of claim 1, wherein one or more global inline functions created for debugging purposes are converted to local information.

15. The method of claim 1, wherein redundant and unused global elements are disregarded.

16. In a computer, a computer program for operating said computer to implement a compilation process, said computer program including functional elements comprising:

a compiler for receiving a source program and for compiling said source program, said compiler comprising:

a module for building a database that identifies each global element within said source program;

a linker for analyzing said source program to determine which global elements do not need to be global elements; and a module for converting said global elements that do not need to be global elements to local elements to produce a recompiled source program;

wherein said linker links said recompiled source program to produce a compiled object file.

17. The apparatus of claim 16, said compiler further comprising:

a first global to local symbol conversion module for identifying all global elements in said source program and for producing an assembler source file.

18. The apparatus of claim 17, said compiler further comprising:

an assembler for receiving said assembler source file and for producing an object file therefrom.

19. The apparatus of claim 18, said linker further comprising:

a second global to local symbol conversion module for determining all dependencies within said object file.

20. The apparatus of claim 19, wherein said determination of said dependencies comprises identifying global elements that are used in more than one file.

21. The apparatus of claim 19, wherein said determination is made for each global element to determine if a given function must be global.

22. The apparatus of claim 19, wherein said global to local symbol conversion module determines if an element is currently global, if the element is not used outside of the file in which it currently resides, and if the element is actually being used by the file.

23. The apparatus of claim 19, wherein said database is accessed to include information regarding global element dependencies.

24. The apparatus of claim 23, wherein database access is a process that involves both reading data produced to identify global elements and writing data produced to identify dependencies for these global elements.

25. The apparatus of claim 16, wherein said compiler produces information regarding the manner in which said source program is to be compiled and a current list of global elements.

26. The apparatus of claim 16, wherein a file produced from said source program by said compiler is analyzed by said linker.

27. The apparatus of claim 16, further comprising:

means for determining which global elements may be safely converted to local elements because they are not used outside of the local file and which global elements may be disregarded because they are not used or are redundant.

28. The apparatus of claim 16, wherein one or more global inline functions created for debugging purposes are converted to local information.

29. The apparatus of claim 16, wherein redundant and unused global elements are disregarded.

* * * * *